United States Patent [19]

Kamio

[11] Patent Number: 4,646,894
[45] Date of Patent: Mar. 3, 1987

[54] PNEUMATIC CLUTCH APPARATUS

[75] Inventor: Takenori Kamio, Neyagawa, Japan

[73] Assignee: Kabushi Kaisha Daikin Seisakusho, Osaka, Japan

[21] Appl. No.: 626,789

[22] Filed: Jul. 2, 1984

[30] Foreign Application Priority Data

Jul. 14, 1983 [JP] Japan ................. 58-129154
Jul. 14, 1983 [JP] Japan ................. 58-129155
Jul. 14, 1983 [JP] Japan ................. 58-129156

[51] Int. Cl.$^4$ .............. F16D 25/04; F16D 13/74
[52] U.S. Cl. ................. 192/85 AA; 192/113 R; 192/88 A; 285/190
[58] Field of Search ......... 192/88 A, 85 A, 113 R, 192/70.12, 91 A, 70.28, 85 AA; 285/190

[56] References Cited

U.S. PATENT DOCUMENTS 2,230,881  2/1941  Browne ................ 285/190 X
3,199,646  8/1965  McBride .............. 192/85 AA
3,351,167  11/1967  Moss ................. 192/88 A X
4,460,079  7/1984  Hanks ................ 192/85 A
4,479,570  10/1984  Kamio ................ 192/85 AA Primary Examiner—Leslie A. Braun
Assistant Examiner—David A. Testardi
Attorney, Agent, or Firm—Burns, Doane, Swecker & Mathis

[57] ABSTRACT

A pneumatic clutch apparatus includes a pneumatic clutch disposed at the rear of a transmission and has a pneumatic actuator for engaging and disengaging the clutch; a rotary passage adapted to rotate together with the clutch and connected to the actuator; a stationary passage stationary with respect to the clutch and connected to a pneumatic pressure control mechanism disposed outside the clutch; and a rotary joint including a connecting passage for connecting the rotary passage and the stationary passage together; the rotary joint having a rotary portion to which the rotary passage is fixed and a stationary portion to which the stationary passage is fixed, and the stationary portion being fixed to a housing of the transmission and rotatably supporting the rotary portion.

8 Claims, 3 Drawing Figures

PNEUMATIC CLUTCH APPARATUS

BACKGROUND AND SUMMARY OF THE INVENTION

The present invention relates to a pneumatic clutch apparatus in which a pressure plate is adapted to be forced by a pneumatic actuator.

Generally in a cluth for an automobile and others, a friction facing of a clutch disc is designed to be pressed by a pressure plate against a flywheel. Further, in the conventional clutch, a clutch spring or springs are provided to force the pressure plate toward the friction facing, and a release mechanism is provided to release an elastic force of the springs from the pressure plate.

However, in the above structure, when the friction facing is worn, the pressing force of the springs decreases. Therefore, it is impossible to use the facing when it is worn to the large extent, which reduces a durability. Further, each time the facing and the release mechanism are worn to some extent, each part requires adjustment.

Furthermore, there are such disadvantages as a large number of parts and a large force being required to depress a clutch pedal.

In order to solve the above disadvantages, the applicant has already disclosed a pneumatic clutch in U.S. Patent application Ser. No. 381,758, Pat. No. 4,479,570 (German Pat. Appln. P 32 19 768.3). This pneumatic clutch is provided with a pneumatic atcuator for forcing a pressure plate. However, the conventional pneumatic clutch has following problems in connection with a rotary joint. Namely, the conventional rotary joint is unstable in the installation condition. Further, passages for supplying lubricating oil into the rotary joint are complicated. Still further, there is a possibility that the lubricating oil may leak into an air passage in the rotary joint. Furthermore, the assembly operation is laborious.

Accordingly, it is an object of the invention to provided an pneumatic clutch apparatus, in which a rotary joint is improved so as to overcome the above-noted disadvantages.

Other and further objects, features and advantages of the invention will appear more fully from the following description of the preferred embodiments of the invention.

DETAILED DESCRIPTION OF THE PREFERRED EMBODIMENT

Figure 1:
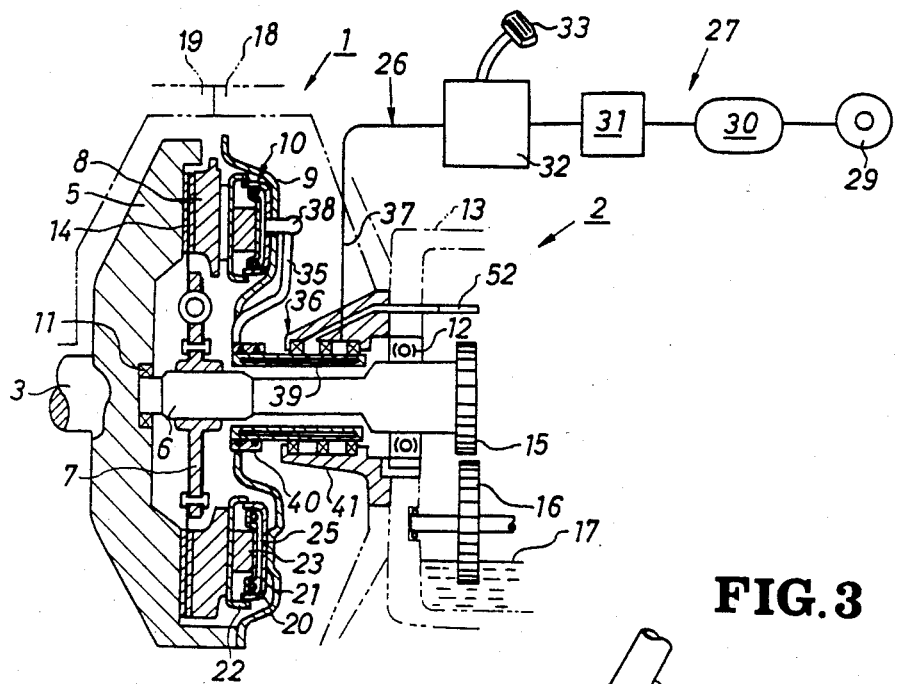
FIG. 1 is a schematic sectional view of a pneumatic clutch apparatus of an embodiment of the invention.

Referring to FIG. 1, a pneumatic clutch 1 is disposed between a transmission 2 and an engine (not shown). The clutch 1 comprises a flywheel 5 connected to an output shaft 3 of the engine, a clutch disc 7 connected to an output shaft of the clutch, a pressure plate 8 and a clutch cover 9. The clutch cover 9 is fixed at the outer periphery to the outer peripheral portion of the flywheel 5. A pneumatic actuator 10 is fixed to the clutch cover 9. The actuator 10 is designed to force the pressure plate 8, so that the plate 8 may press a friction facing 14 at the radially outer portion of the disc 7 against the flywheel 5 to engage the clutch 1. When the clutch 1 is engaged, power is transmitted from the flywheel 5 through the disc 7 to the output shaft 6.

The output shaft 6 is supported by a flywheel 5 and a housing 13 of the transmission 2 through bearings 11 and 12. A top gear 15 of the transmission 2 is fixed to an end of the output shaft 6 in the housing 13. The gear 15 is operable to be connected to an output gear (not shown) through a counter gear 16 or other gears in the housing 13. Lubricating oil 17 is reserved in the bottom of the housing 13. The gear 16 and the other gears splash the oil 17, and the gears in the transmission are designed to be lubricated by the oil splash.

At the rear of the bearing 12, an inner portion of a clutch housing 18 is fixed to the outside surface of the transmission housing 13. The outer end of the housing 18 is fixed to an outer end of a flywheel housing 19. Said members of the clutch 1 are disposed in both housings 18 and 19.

Said actuator 10 is located between the pressure plate 8 and the clutch cover 9. The actuator 10 is provided with a cylinder 20 fixed to the cover 9, a piston 21 fitted into the cylinder 20 and a case 22 surrounding the cylinder 20. The piston 21 is fixed to bosses of the plate 8 with a heat insulator 23 and the case 22 therebetween. A pressure chamber 25 is formed between the piston 21 and the cylinder 20. When a pneumatic high pressure is supplied into the chamber 25, the piston 21 forces the plate 8 toward the flywheel 5. Although not illustrated, the plate 8 and the flywheel 5 are connected through elastic straps, so that the straps elastically remove the plate 8 from the facing 14 when the pneumatic pressure is released in the chamber 25. Said cylinder 20 and the piston 21 have substantially annular shape extending along the plate 9. A diaphragm or bellows may be substituted for the piston cylinder mechanism (21 and 22).

The pressure chamber 25 is connected through an air passage mechanism 26 to a pneumatic pressure control mechanism 27 disposed at the outside of the housing 18. The pneumatic pressure control mechanism 27 is so constructed that a compressor 29 is connected through an air tank 30 and a pressure regulator valve 31 to a pressure control valve 32. The compressor 29 is adapted to be driven by the engine. The regulator valve 31 regulates the pneumatic pressure to be supplied to the control valve 32 to a constant value. The control valve 32 is connected to a clutch pedal 33, so that the valve 32 may reduce the pressure supplied to the air passage mechanism 26 as the clutch pedal 33 is stepped on. Thus, when the pedal 33 is released, the full pressure is introduced into the chamber 25 so that the clutch 1 is engaged. When the pedal 33 is fully stepped on, the pressure in the chamber 25 is released, so that the clutch 1 is disengaged. When the pedal 33 is depressed halfway, a low pressure is introduced into the chamber 25, so that the clutch 1 takes a half-engaged condition in which the facing 14 is pressed against the flywheel 5 with slipping thereon.

The air passage mechanism 26 comprises a rotary passage 35, a rotary joint 36 and a stationary passage 37. The rotary passage 35 is formed by a pipe provided in the housing. One end of the passage 35 is connected to the pressure chamber 25 through a joint 38. A stationary passage 37 is formed by a pipe extending from the inside of the housing 18 to the outside thereof. One end of the passage 37 is connected to an outlet of the control valve 32. is apparent from the above explanation, the rotary passage 35 rotates together with the clutch cover 9, and the stationary passage 37 is stationary with respect to the cover 9. The rotary joint 36 has an inside connection passage 39 by which both passages 35 and 37 are connected together. The joint 36 comprises a rotary portion 40 and a stationary portion 41. The rotary passage 35 is connected to the rotary portion 40. The stationary passage 37 is connected to the stationary portion 41.

Figure 2:
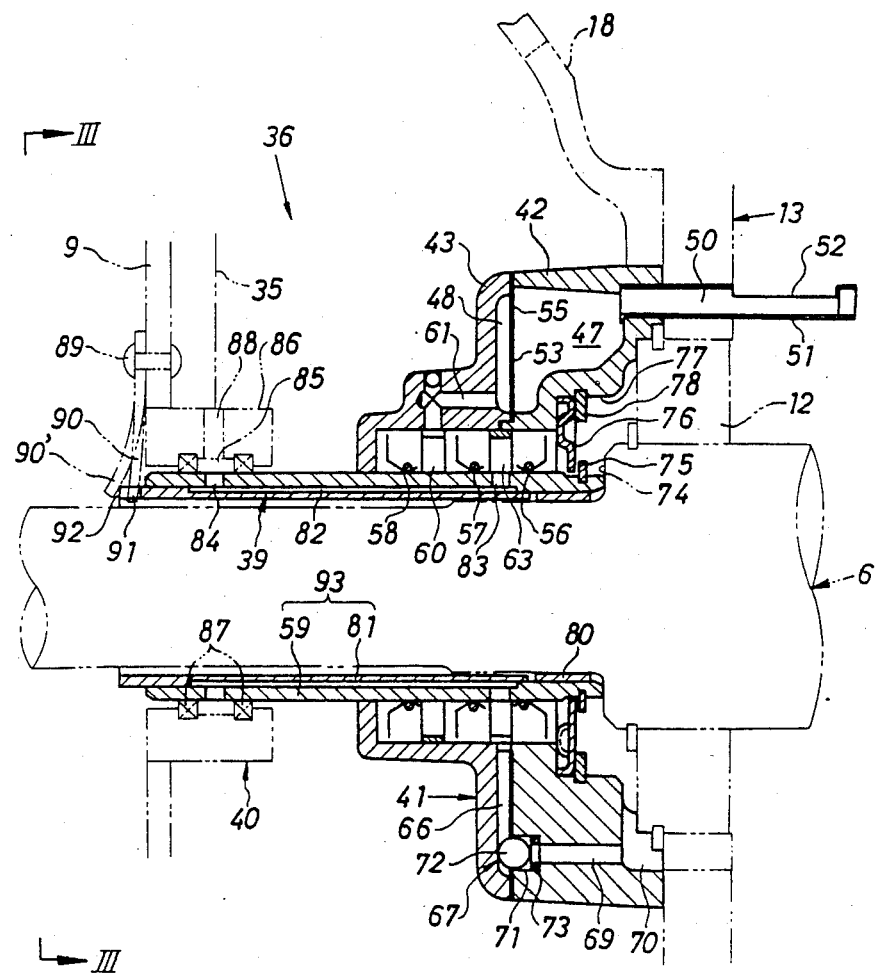
FIG. 2 is an enlarged partial sectional view of FIG. 1.

Referring to FIG. 2, the stationary portion 41 comprises a body 42 and a cover 43 which are annular and disposed around the output shaft 6. The body 42 is fixed to the transmission housing 13 by bolts 45 shown in FIG. 3. The cover 43 is fixed to the end surface of the body 42 opposite to the housing 13 by bolts 46 shown in FIG. 3. Oil reservoirs 47 and 48 are formed at the inside of the upper portion of the body 42 and the cover 43. An oil supplying passage 50 is connected to the upper portion of the reservoir 47. The passage 50 is formed by a pipe 51 fitted into ports of the housing 13 and the body 42. An inlet portion of the pipe 51 protrudes into the housing 13. This protruding portion is recessed at the upper portion to form an inlet opening 52 for the oil.

A separator 53 is disposed between the oil reservoirs 47 and 47. The separator 53 is held between the body 42 and the cover 43, and is provided a port 55 connecting both oil reservoirs 47 and 48 together.

The body 42 and the cover 43 are fitted to an outer periphery of a cylindrical shaft 59 of the rotary portion 40 through oil seals 56, 57 and 58. The seals 57 and 58 are disposed inside the cover 43. An annular oil passage 60 is formed between the seals 57 and 58. The oil passage 60 is connected through an oil passage 61 in the cover 43 to the bottom of the oil reservoir 48. The seal 56 is disposed inside the body 42. An anuular air passage 63 is formed between the seals 56 and 57. The outer periphery of the air passage 63 is connected to the stationary passage 37 through a passage (not shown) in the stationary portion 41 and a joint 67 (FIG. 3) fixed to a boss of the cover 43.

Referring to FIG. 2, an upper end of an oil passage 66 for discharging leakages is connected to a lower portion of the air passage 63. The passage 66 is provided between the separator 53 and the cover 43. The lower end of the passage 63 is connected to an oil passage for discharging the oil through a valve mechanism 67. The passage 69 extends substantially horizontally in the body 42 and is connected to a space 70 in which the bearing 12 is located. The end 71 of the passage 69 adjacent to the passage 66 is large in diameter. A ball 72 and the valve seat ring 73 of the valve mechanism 67 are disposed in the large end 71. The ring 73 is fitted in airtight condition into the inner periphery of the end 71. The ball 72 is located between the passage 66 and the ring 73 with a slight space to the inner periphery of the end 71.

One end of said cylindrical shaft 59 is in contact with or adjacent to an annular stepped portion 74 on the outer periphery of the output shaft 6. At the rear of the stepped portion 74, a snap ring 75 is fixed to the outer periphery of the cylindrical shaft 59. An annular stopper plate 76 is provided between the snap ring 75 and the seal 56. The outer periphery of the plate 76 is fitted to an inner peripheral surface 77 having a large diameter provided at a portion of the body 42 near the housing 13, and is fixed thereto by a snap ring 78.

The cylindrical shaft 59 projects from the stationary portion 41 to the rear of the clutch cover 9. The end of the shaft 59 near the stepped portion 74 is fitted through a bushing 80 to the output shaft 6. A cylindrical shaft 81 of a small diameter is disposed inside the cylindrical shaft 59. Both ends of the shaft 81 are located at the rear of the bushing 81 and the cover 9 and are rigidly fitted in airtight condition into the shaft 59, so that an air passage 82 of which both ends are closed in formed between the shafts 59 and 81. The shaft 59 is provided with ports 83 and 84 respectively connecting to both ends of the passage 82. Said passage 63 is connected to the passage 82 through the port 83. The port 84 connects the passage 82 to an air passage 85 detailed hereinafter.

A cylindrical fixed member 86 is welded to the inner periphery of the clutch cover 9. The member 86 is fitted to the outer periphery of the end of the cylindrical shaft 59 through two seals 87. Said passage 85 is formed by an annular groove provided at the inner periphery of the member 86 and between both the seals 87. The end of said rotary passage 35 is fixed to the outer periphery of the member 86 through a joint (not shown). A passage 88 is formed in the member 86 to connect the passages 85 and 35 together.

Figure 3:
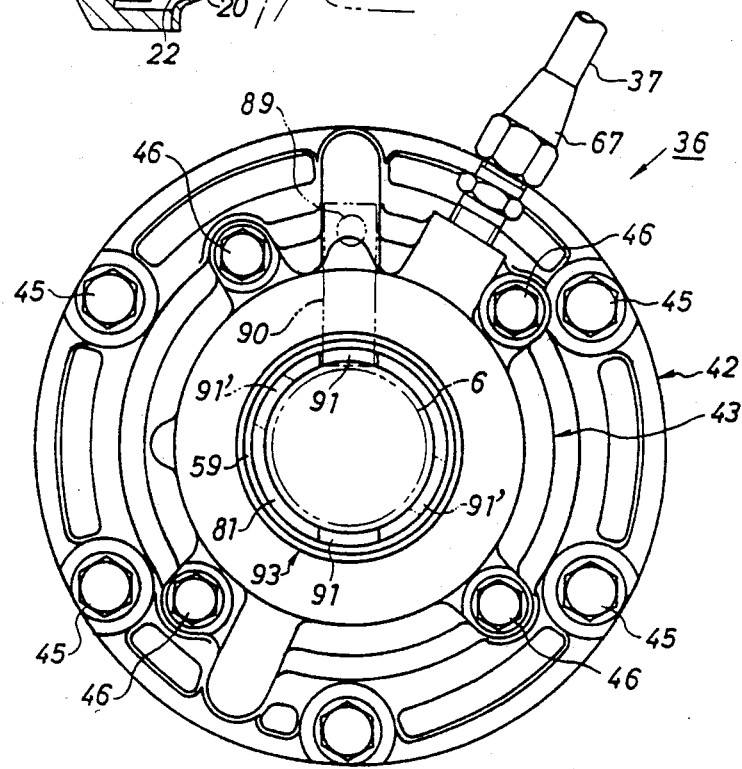
FIG. 3 is a front view taken along line III—III in FIG. 2.

A leaf spring 90 is fixed by a rivet 89 to the inner peripheral portion of the clutch over 9. As shown in FIG. 3, The leaf spring 90 is of belt-like shape and extends to the rear of the outer periphery of the output shaft 6. As shown in FIG. 2, the leaf spring 90 extends substantially along the end surfaces of the fixed member 86 and the cylindrical shaft 59, and engages with a recess 91 at the end of the shaft 81. As shown in FIG. 3, The recess 91 is slightly wider than the spring 90. The spring 90 engaged with the recess 91 prevents the relative rotation of the shafts 59 and 81. Other similar recess 91 diametrally opposite to said recess 91 are also formed at the end of the cylindrical shaft 81. As shown in FIG. 2, the end of the shaft 81 in which the recesses 91 are formed protrudes beyond the shaft 59. The spring 90 contacts a non-recessed end 92 of the shaft and is elastically deformed as shown by a numeral 90' before engaging with the recess 91.

Above spring mechanism facilitates assembly operation as detailed hereinafter. Initially, in the assembly operation, the stationary portion 41 and the clutch housing 18 are fixed to the transmission housing 13, and then, the assembled shaft 59 and 81, namely an intermediate member 93, is fitted into the stationary portion 41. Then, the clutch assembly comprisisng the flywheel 1 in FIG. 1, the disc 7, the pressure plate 8, the clutch cover 9 and the others are assembled around the output shaft 6. Next, the flywheel housing 19 and the clutch housing 20 are fixed together. The fixed member 86 and the passage 35 are preassembled to the cover 9. And thus, in above asembly operation of the clutch assembly, the fixed member 86 is fitted to the cylindrical shaft 59. In this fitting operation, the spring 90 probably deviates from the recesses 91 as shown by numerals 91' in FIG. 3 and disengages therefrom. However, even in the deviated condition, the spring 90 coincides and engages with the recess 91 before a half rotation of the cover 9, when the assembly starts to be driven. Thereafter, the intermediate member 93 is connected by the spring 90 and rotates together with the fixed member 86 and the cover 9. Therefore, in the rotary joint 36, sliding occurs only at the inner peripheries of the seals 56, 57 and 58. The non-rotation seal 87 type does not slide on the cylindrical shaft 59, so that the seal 87 is prevented from breakage.

As detailed above, the circumferential position of the fixed member 86 and the intermediate member 93 is automatically determined by the spring 90 and the recess 91, which facilitates the assembly operation. In other words, the seal 87 can be of non-rotation type, so that the seal 87 can be inexpensive.

An operation is as follows. Referring to FIG. 1, the pedal 33 is operated to control the pressure in the pressure chamber 25, and thus, the engagement and disengagement of the clutch 1 is controlled. The pressure in the chamber 25 is supplied from the control valve 32 through the stationary passage 37, the inner connecting passage 39 in the rotary joint 36 and the rotary passage 35. The connecting passage 39 is formed by the passage 63, the port 83, the passage 82, the port 84, the passages 85 and 88 and others. While the engine is driven, the fixed memeber 86 and the intermediate member 93, namely the rotary portion 40, rotate together with the cover 9 with respect to the stationary portion 41.

In the above operation, some of the oil splash in the housing 13 falls into the inlet opening 52 and flows through the passage 50 into the reservoir 47. The oil in the reservoir 47 flows through the port 55 into the reservoir 48 and is then supplied through the passages 60 and 61 to the sliding surfaces (sealing surfaces) of the seals 57 and 58. Therefore, the seals 57 and 58 are sufficiently lubricated and surely seal the passage 63.

Although the oil spash in the housing 13 includes extraneous harmful material such as worn powder of the transmission gears, the extraneous material deposits in the bottom of the oil reservoir 47, so that the oil excluding the harmful material flows through the upper port 55 into the passages 60 and 61. Thus, there is no possibility of breakage of the seals 57 and 58.

Some of the oil splash in the housing 13 flows through the inside of the bearing 12 and the space between the plate 76 and the output shaft 6 and reach the seal 56. Thus, the seal 56 is lubricated and surely seals the passage 63. The space between the seal 56 and the plate 76 may be connected to the upper portion of the oil reservoir 47 through a passage (not shown).

Only a little of the oil which lubricates the seals 56 and 57 leaks into the passage 63. However, this leakage oil flows from the passage 63 down to the passage 66. When the passage 63 is not pressurized, the ball 72 disengages with the ring 73. Therefore, the oil in the passage 63 flows around the ball 72 into the passage 69, and then returns through the space 70 into the housing 13. When the passage 63 is pressurized, the ball 72 is seated and pressed onto the ring 73 by the pressure in the passage 63. Therefore, the air in the actuator 10 is not discharged into the passage 69, and thus, the clutch 1 is surely engaged. Until the ball 52 is seated on the ring 73 after the pressurizing of the passage 63, the air rapidly flows around the ball 72 to the passage 69. This air flow discharges the oil near the ball 72 into the passage 69. As stated above, the oil in the passage 63 is surely discharged, so that the oil never flows into the pressure chamber 25 in FIG. 1. Therefore, the actuator 10 always operates sufficiently.

According to the invention, as stated hereinbefore, the stationary portion 41 of the rotary joint 36 is fixed to the transmission housing 13, and the stationary portion 41 supports the rotary portion 40. Therefore, the rotary joint 36 can be installed stably.

According to the illustrated structures, following advantages can be obtained.

Since the oil for the seal 57 is adapted to be supplied from the adjacent transmission 2, the structure of the oil passages 50, 60, 61 and the others can be simple in comparison with an oil passage structure for introducing the oil from the engine.

The passages 66 and 69, which are operable to discharge the leakage oil and including the valve mechanism 67 such as the ball 72, are connected to the connecting passage in the joint 36. Therefore, the oil is surely prevented from flowing into the actuator 10, and thus, the actuator 10 can always operate sufficiently.

The spring mechanism including the leaf spring 90 is operable to set the positions of the intermediate member 93 and the fixed member 86 of the rotary portion 40, which faciliates the assembling operation of the rotary joint 36.

In a modification of the invention, a reed type valve mechanism may be substituted for the valve mechanism 67 including the ball 72. A detent ball type spring mechanism may be substituted for the spring mechanism including the leaf spring 90.

Although the invention has been described in its preferred form with a certain degree of particularity, it is understood that the present disclosure of the preferred form may be changed in the details of contruction and the combination and arrangement of parts may be resorted to without departing from the spirit and scope of the invention as hereinafter claimed.

What is claimed is:

1. A pneumatic clutch apparatus comprising:
a pneumatic clutch disposed at the rear of a transmission and including a pneumatic actuator for engaging and disengaging the clutch; a rotary passage adapted to rotate together with the clutch and connected to the actuator; a stationary passage stationary with respect to the clutch and connected to a pneumatic pressure control mechanism disposed outside the clutch; and a rotary joint including a connecting passage for connecting the rotary passage and the stationary passage together; said rotary joint having a rotary portion to which the rotary passage is fixed and a stationary portion to which the stationary passage is fixed, and said stationary portion being fixed to a housing of the transmission and rotatably supporting the rotary portion;
wherein a cylindrical intermediate member is disposed between the rotary portion and the stationary portion of the rotary joint, air passages in the stationary portion and the rotary portion are connected together through an air passage in the intermediate member, the intermediate member is rotatably fitted to the rotary portion and the stationary portion through seals which seal the air passage, a connecting mechanism is operable to connect the intermediate member to the rotary portion when the intermediate member and the rotary portion occupy a predetermined relative angular position; and
wherein said connecting mechanism comprises a spring fixed to the rotary portion and a recess provided at the end of the intermediate member, and said spring is adapted to deform from a non-recessed end of the intermediate member into the recess.

2. A pneumatic clutch apparatus comprising:
a pneumatic clutch disposed at the rear of a transmission and including a pneumatic actuator for engaging and disengaging the clutch; a rotary passage adapted to rotate together with the clutch and connected to the actuator; a stationary passage stationary with respect to the clutch and connected to a pneumatic pressure control mechanism disposed outside the clutch; and a rotary joint including a connecting passage for connecting the rotary passage and the stationary passage together; said rotary joint having a rotary portion to which the rotary passage is fixed, a cylindrical intermediate portion, and a stationary portion to which the stationary passage is fixed, and said stationary portion being fixed to a housing of the transmission and rotatably supporting the rotary portion;

wherein the rotary joint includes seals disposed between the intermediate portion and the stationary portion for sealing the inside connecting passage and an oil supplying passage for supplying the oil to sliding surface of the oil seals, an inlet portion of the oil supplying passage is protruded into the transmission housing, and said inlet portion is provided with an inlet opening for receiving oil splash in the transmission housing.

3. A pneumatic clutch apparatus of claim 2 wherein said inlet portion of the oil supplying passage is formed by a pipe fitted into an aperture in the transmission housing and protruding into the transmission housing, and said inlet opening is formed by a recess formed at an upper portion of the protruding end of the pipe.

4. A pneumatic clutch apparatus of claim 2 wherein an oil reservoir forming a part of the oil supplying passage is provided in the upper portion of the stationary portion, so that a bottom portion of the oil reservoir may form a depositing chamber for extraneous material.

5. A pneumatic clutch apparatus of claim 2 wherein said stationary portion comprises an annular body fixed to the transmission housing and a cover fixed to the body, a separator is held between the body and the cover, said body is provided at an upper portion with a hollow closed by the separator to form an oil reservoir forming a part of the oil supplying passage, the separator is provided with an upper port forming an outlet of the reservoir, and a bottom portion of said oil reservoir forms a depositing chamber for extraneous material.

6. A pneumatic clutch apparatus of claim 2 wherein said stationary portion is provided with a discharge passage for leak oil extending downward from the lower portion of the connecting passage to the inside of the transmission housing and a valve mechanism operable by the pneumatic pressure in the connecting passage to close the discharge passage.

7. A pneumatic clutch apparatus of claim 2 wherein a cylindrical intermediate member is disposed between the rotary portion and the stationary portion of the rotary joint, air passages in the stationary portion and the rotary portion are connected together through an air passage in the intermediate member, the intermediate member is rotatably fitted to the rotary portion and the stationary portion through seals which seal the air passage, a connecting mechanism is provided for unrotatably connecting the rotary portion and the intermediate member together, and the connecting mechanism is operable to connect the intermediate member to the rotary portion when the intermediate member and the rotary portion occupy a predetermined relative angular position.

8. A pneumatic clutch apparatus of claim 2 wherein a cylindrical intermediate member is disposed between the rotary portion and the stationary portion of the rotary joint, air passages in the stationary portion and the rotary portion are connected together through an air passage in the intermediate member, the intermediate member is rotatably fitted to the rotary portion and the stationary portion through seals which seal the air passage, a connecting mechanism is provided for unrotatably connecting the rotary portion and the intermediate member together, the connecting mechanism is operable to connect the intermediate member to the rotary portion when the intermediate member and the rotary portion occupy a predetermined relative angular position, said connecting mechanism comprises a spring fixed to the rotary portion and a recess provided at the end of the intermediate member, and said spring is adapted to deform from a non-recessed end of the intermediate member into the recess.

* * * * *